US011905909B2

(12) United States Patent
Klampfer et al.

(10) Patent No.: US 11,905,909 B2
(45) Date of Patent: Feb. 20, 2024

(54) LIQUID-COOLED CYLINDER HEAD

(71) Applicant: AVL LIST GMBH, Graz (AT)

(72) Inventors: Martin Klampfer, Hitzendorf (AT); Andreas Zurk, Weinburg (AT)

(73) Assignee: AVL LIST GMBH, Graz (AT)

( * ) Notice: Subject to any disclaimer, the term of this patent is extended or adjusted under 35 U.S.C. 154(b) by 0 days.

(21) Appl. No.: 18/104,664

(22) Filed: Feb. 1, 2023

(65) Prior Publication Data

US 2023/0175455 A1 Jun. 8, 2023

Related U.S. Application Data

(63) Continuation of application No. 17/424,877, filed as application No. PCT/AT2020/060020 on Jan. 23, 2020, now Pat. No. 11,598,283.

(51) Int. Cl.

*F02F 1/16* (2006.01)
*F01L 3/08* (2006.01)
*F02F 1/42* (2006.01)

(52) U.S. Cl.

CPC *F02F 1/16* (2013.01); *F01L 3/08* (2013.01); *F02F 1/4285* (2013.01)

(58) Field of Classification Search

CPC ...................................... F02F 1/16; F01L 3/05
See application file for complete search history.

(56) References Cited

U.S. PATENT DOCUMENTS 4,951,622 A * 8/1990 Takahashi .............. F01M 11/02 123/193.5
8,899,207 B2 * 12/2014 Megel ................... F02F 1/4214 123/193.5
2002/0062795 A1 * 5/2002 Inoue ..................... F01M 11/02 123/41.1
2009/0114173 A1 * 5/2009 Haubner ................... F02F 1/40 123/193.5
2011/0083622 A1 * 4/2011 Megel ..................... F02F 1/242 123/193.5
2011/0083624 A1 * 4/2011 Megel ....................... F02F 1/40 123/193.5
2013/0340703 A1 12/2013 Jones et al.
(Continued)

FOREIGN PATENT DOCUMENTS

EP 1028247 A2 8/2000
JP 2011174437 A 9/2011
(Continued)

*Primary Examiner* — Long T Tran
(74) *Attorney, Agent, or Firm* — Dykema Gossett PLLC

(57) ABSTRACT

Various embodiments of the present disclosure are directed to liquid-cooled cylinder heads. In one example embodiment, a cylinder head is disclosed including a component which extends into a combustion chamber, an upper cooling jacked, a lower cooling jacket, a plurality of valves arranged around the component, a plurality of cylinder head screws, an oil deck, a fire deck, a plurality of valve guides, and a fixed connection. The fixed connection is arranged from each valve guide to the component, and is a ring having at least one support. The support and the ring extend at least from the oil deck to the fire deck thereby bounding the combustion chamber, and the component is connected to the plurality of cylinder head screws.

20 Claims, 6 Drawing Sheets

(56) References Cited

U.S. PATENT DOCUMENTS

| | | | | |
|---|---|---|---|---|
| 2015/0361862 | A1* | 12/2015 | Williams | F01P 3/02 123/41.01 |
| 2016/0356201 | A1 | 12/2016 | Petutschnig et al. | |
| 2017/0044967 | A1* | 2/2017 | Maki | F02F 7/0007 |
| 2018/0230935 | A1* | 8/2018 | Ali | F01P 3/02 |
| 2018/0258878 | A1* | 9/2018 | Maki | F02F 1/004 |

FOREIGN PATENT DOCUMENTS

| | | | |
|---|---|---|---|
| WO | 2005042955 | A2 | 5/2005 |
| WO | 2018057305 | A1 | 3/2018 |

* cited by examiner

LIQUID-COOLED CYLINDER HEAD

CROSS-REFERENCE TO RELATED APPLICATIONS

This application is a continuation of U.S. application Ser. No. 17/424,877, filed 21 Jul. 2021, which is a national stage filing based upon International application No. PCT/AT2020/060020, filed 23 Jan. 2020, which claims the benefit of priority to Austria application No. A 50050/2019, filed 23 Jan. 2019.

BACKGROUND

The invention relates to a liquid-cooled cylinder head having a component extending into a combustion chamber, wherein an upper cooling jacket and a lower cooling jacket are provided and a plurality of valves are disposed around the component, wherein cylinder head screws are provided.

Such cylinder heads are well known from the prior art. The component may be a spark plug, an injector for fuel injection or a receiving sleeve of a spark plug or an injector. The valves here include intake valves and exhaust valves. In prior-art cylinder heads, a force is introduced into the cylinder head by cylinder head screws and the explosive combustion of the fuel in a combustion chamber. The force thereby extends only locally at the points of introduction, leading to deformations in the cylinder head. This can lead to the cylinder head gasket being damaged by these deformations and to further leakage.

Furthermore, due to the local application of force, the valve guide is often also affected by deformation, which can sometimes lead to problems when the valve is actuated and to uneven loads on the valve disc and uneven wear.

It is the object of the present invention to provide a cylinder head by which the deformations are reduced.

SUMMARY OF THE INVENTION

This object is solved by an initially mentioned cylinder head in accordance with the invention in that a fixed connection to the component is arranged from each valve guide, which is designed as a ring having at least one support, wherein the support and the ring extend at least from an oil deck of the cylinder head to a fire deck that delimits the combustion chamber, wherein the component is connected to the cylinder head screws. As a result, the force originating from the cylinder head screws is transmitted uniformly to the supports via the oil deck and/or the intermediate deck and/or the fire deck. Deformations are avoided by this uniform distribution of the force in the cylinder head. In particular, no direct connection is provided between the cylinder head screws and the valve guides. According to the invention, a mechanical connection between the cylinder head screws and the valve guides is made indirectly, so that the valve guide and thus the valve slugs are force-decoupled or at least substantially decoupled from the cylinder head screws. Particularly preferably, two cylinder head screws are indirectly connected to two valve guides in each case.

Advantageously, the cylinder head screws are therefore connected indirectly to the valve guides. Due to the alignment of the supports towards the component, the force is not introduced directly via valve guides but past them into the component and from there further into the supports and into the exhaust port wall and/or into the intake port wall in the area of the valve guide. This also reduces or completely eliminates deformation of the valve guide. Particularly preferably, the respective cylinder head screws do not lie on a common straight line with a respective valve guide and the component. Consequently, a valve star formed by all valve guides in a section through the cylinder head and a cylinder head star formed by all cylinder head screws in a section through the cylinder head are thus arranged offset from one another. This preferred assignment of the cylinder head star to the valve star is advantageous for the above-mentioned introduction of force. As a result, forces are preferably not transmitted directly from the cylinder head screws to the valve guides.

A support means here an area of the cylinder head along which a force can be transmitted. The description that the support and ring extend from an oil deck to a fire deck means that it is not mandatory that both extend from oil deck to fire deck by themselves, but that they are continuous together. Thus, in the illustrated embodiment, the ring first extends from the oil deck to the supports and the supports extend from the ring to the fire deck. In the context of the invention, cylinder head screws are also understood to mean, in particular, cylinder head screw sockets.

The force is preferably introduced between the valve guides via a rib into the ring and then into the vertical support. The valve guide points are thus decoupled from the force application. This largely avoids the disadvantage of large deformation when force is introduced into the valve guides. According to the invention, a force connection is provided from the cylinder head screws via the ribs into the ring and then vertically via the supports. The ribs are arranged in the valve reinforcing ribs between the valve guides in a plane with respect to the connecting line between the valve guides.

It is favorable if it is provided that the ring radially surrounds the component and is preferably designed in one piece with the support, wherein the ring is connected to the support in particular in the area of the valve guides. This makes it optimally possible to absorb and distribute the acting forces evenly. In other embodiments, it is provided that the ring is not of continuous design but consists only of circular ring elements, which is connected to the supports in particular in the region of the valve guide slugs.

A particularly favorable design with regard to possible deformation and thus also, subsequently, safety against buckling for the supports is obtained if the support is formed essentially parallel to a cylinder axis of the cylinder head.

To increase flow velocities in the coolant, it is favorable if flow cross sections are reduced by designing the supports as partition walls which at least partially separate the upper cooling jacket and/or the lower cooling jacket. This results in higher flow velocities, especially in areas of higher thermal stress around the valves and the component, and increases the forced convective heat transfer from the cylinder head to the coolant.

It is provided in one favorable embodiment that the oil deck is tapered in the direction of the supports for the introduction of forces, so that the oil deck forms an angle to the component which is greater than 90°, preferably between 110° and 144°, and particularly preferably between 120° and 135°. As a result, the force is transmitted from the cylinder head screws along the oil deck at an angle to the supports. In parallel, the force is directed along a thickening in the cylinder head obliquely from the outside from the cylinder head screws to the intermediate deck and from there to the supports around the component.

It is advantageous if a wall is provided between each two cylinder head screws, wherein each wall extends in particular at least from the oil deck of the cylinder head to the fire deck bounding the combustion chamber. Each wall thus connects two cylinder head screws to one another, which increases the stability of the cylinder head. Forces acting on and/or caused by the cylinder head screws are transmitted from the cylinder head screws to the walls. In particular, each wall connects cylinder head screws to one another.

It is particularly advantageous if at least one cylinder head screw is connected to a support via a rib and preferably at least two opposite cylinder head screws are each connected to a support via a rib. Due to the connection of the cylinder head screws to the ribs and further into the component arranged parallel to the cylinder axis in the central area, it is possible for the applied force to spread evenly up to the firing deck, thus reducing the local stresses at high peak pressure requirements.

It is practical if the rib connects two cylinder head screws via the wall to the ring for force transmission. Forces are thus transmitted from the cylinder head screws via the wall, into the rib and finally into the ring and from there into the supports. The rib is preferably arranged approximately orthogonally to the wall and connects the wall to the ring. It is advantageous if the ribs are arranged in each of the valve bridges. Deformation of the cylinder head is at least reduced by this design and the resulting force paths. A force connection of the individual cylinder head screws takes place via the walls and the ribs in the ring, with forces then being transmitted vertically via the supports.

It is particularly advantageous if three ribs are provided in each case along the cylinder axis between every two cylinder head screws. The ribs are advantageously arranged in the oil deck, the intermediate deck and the fire deck so that force is introduced from the cylinder head screws into the ring in these three planes.

In order to improve the introduction of force, it is favorable if the oil deck has an increasing wall thickness in the region of the ribs towards the component, which has a thickness at the component which has a ratio to an average oil deck thickness which is between 1.5 and 6 and is preferably between 3 and 4 and is particularly preferably about 3.7.

A particularly favorable geometry results if at least one support forms an intake port wall and/or an exhaust port wall or is directly connected to the intake port wall and/or the exhaust port wall. In addition, this further reduces deformation, since forces are diverted back out of the cylinder head. The intake port wall and/or the exhaust port wall are arranged in particular in the area of the intermediate deck, with the supports preferably merging into the port walls in each case below the valve guide slugs.

Alternatively or additionally, it may be advantageous if at least one support is directly connected to a further rib, wherein the further rib is arranged in particular in an intermediate deck of the cylinder head. Particularly preferably, the further ribs are provided in those supports which do not terminate in the region of or directly in an intake port wall and/or the exhaust port wall. It is therefore favorable if the supports are connected both to the intake port wall and/or the exhaust port wall and to further ribs in order to transmit forces into the intermediate deck. In particular, one support is connected to the intake port wall, one support to the exhaust port wall and two supports to one further rib each.

A particularly simple and favorable embodiment with regard to the introduction of force and distribution of force in the cylinder head is obtained if at least four—preferably six or eight—cylinder head screws are provided for connection to a cylinder block.

The cylinder head screws are arranged essentially at the corners of a square, a regular hexagon or a regular octagon.

This effect can even be enhanced if the cylinder head screws are arranged essentially on a common pitch circle and the pitch circle has its center in the region of the cylinder axis and/or if the cylinder head screws are arranged uniformly on this pitch circle.

An advantageous geometry with low thicknesses of material accumulations in the cylinder head is achieved by an embodiment which provides that at least two cylinder head screws are arranged in an exhaust port wall and/or by an embodiment which provides that at least two cylinder head screws are arranged in an intake port wall.

It is convenient if two intake valves and two exhaust valves are provided and at least two cylinder head screws are arranged on an axle connecting two valve bridges between intake and exhaust. A valve bridge means here the accumulation of material between a first exhaust valve and a first intake valve and a second exhaust valve and a second intake valve. This arrangement allows the force to be transmitted from these two cylinder head screws via the valve bridge to the support.

It is particularly advantageous if all cylinder head screws are connected by walls, wherein each wall is arranged in a plane parallel to the cylinder axis. These walls, which extend around the entire cylinder, achieve a particularly uniform distribution of the forces from the cylinder head screws in the cylinder head.

Due to the increased number and even distribution of the cylinder head screws, the local introduction of force into the cylinder head structure is reduced. Furthermore, the resulting pressure on the cylinder-head gasket is distributed more evenly over the contact surface. Local deformation and leaks are prevented in this way.

BRIEF DESCRIPTION OF THE DRAWING

The invention is described in more detail below with reference to the non-limiting embodiments in the figures, wherein.

DETAILED DESCRIPTION

Figure 1:
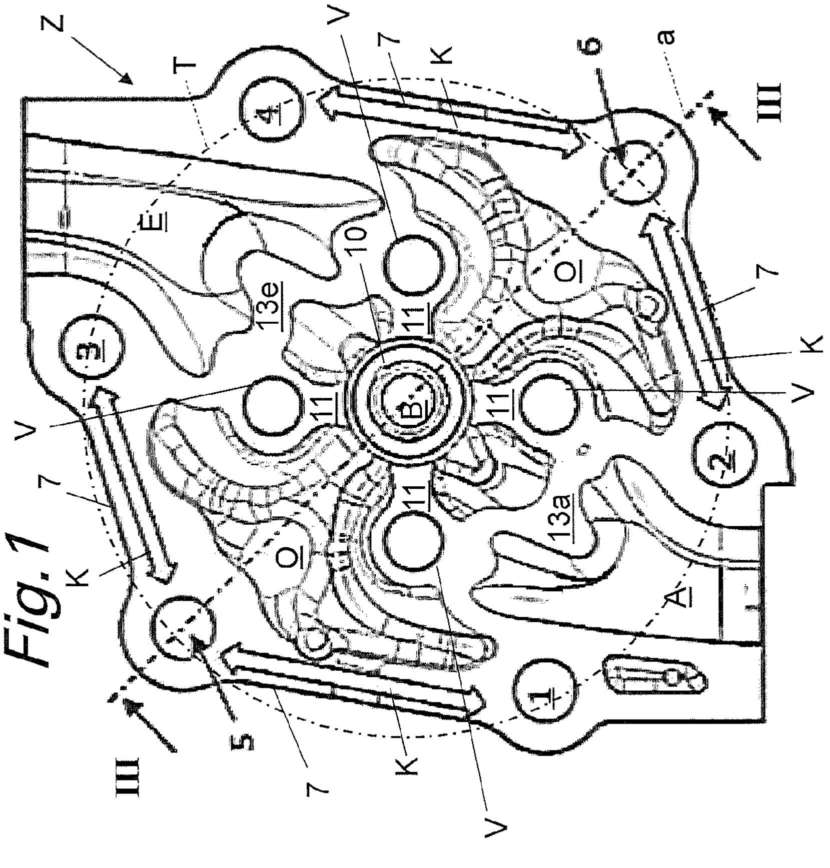
FIG. 1 shows a liquid-cooled cylinder head according to the invention in a first embodiment in a sectional view along a normal plane through the cylinder axis.

FIG. 1 shows a cooled cylinder head Z connected by six cylinder head screws 1 to 6 to a cylinder block (not shown).

Figure 2:
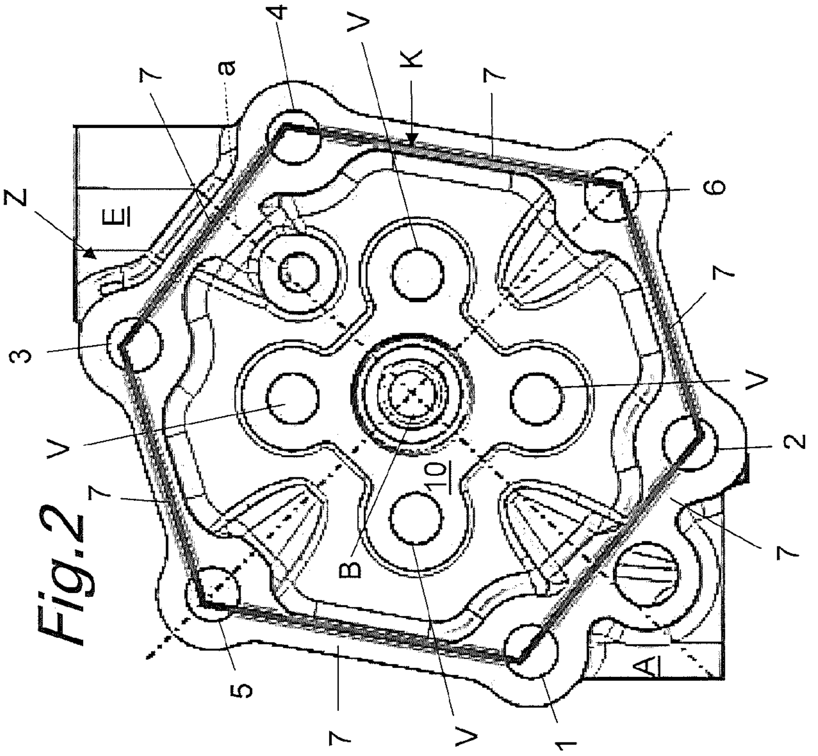
FIG. 2 shows the cylinder head in a section parallel to FIG. 1.

The resulting internal combustion engine has a cylinder. The cylinder head screws 1 to 6 have walls 7 between them. All cylinder head screws 1 to 6 form a so-called cylinder head star. In FIG. 1, walls 7 can be seen between a first cylinder head screw 1 and a fifth cylinder head screw 5 and from the latter to a third cylinder head screw 3. Furthermore, walls 7 are shown between a second cylinder head screw 2 and a sixth cylinder head screw 6 and from the latter to the fourth cylinder head screw 4. These walls 7 are oriented substantially parallel to an axis of the cylinder. An intake port E is arranged between third and fourth cylinder head screws 3, 4. An exhaust port A is arranged between first and second cylinder head screws 1, 2. It can be seen from FIG. 2 that a wall 7 is also provided between first and second cylinder head screws 1, 2 in a region above the exhaust port A and between third and fourth cylinder head screws 3, 4 in a region above the intake port E in each case. In FIG. 1, the arrows with reference sign K indicate the distribution of the force in this plane. In FIG. 2, this reference sign K is assigned to the hexagon with the cylinder head screws 1 to 6 as corner points. This represents the uniform force distribution along the walls between the cylinder head screws 1 to 6.

Within the hexagon formed by cylinder head screws 1 to 6, an upper cooling jacket O for coolant, valve guides V and a component B can be seen. Four valve guides V are arranged evenly around component B and the valve guide bores of the valve guides V are arranged parallel to the axis of the cylinder. All valve guides V form a valve star. The axis of rotation of component B is also arranged parallel to the axis of the cylinder. The valve guides V and component B are connected via a ring 10 with supports 11.

The cylinder head star is arranged offset to the valve star, i.e. the cylinder head screws 1 to 6 do not lie on a common straight line with the valve guides V and the component B as can be clearly seen from FIG. 1 and FIG. 2.

The cylinder head screws 1 to 6 lie on a common pitch circle T and are approximately the same distance apart.

The first cylinder head screw 1 and the second cylinder head screw 2 are each connected to a valve guide V via the exhaust port wall 13*a* and are further connected to component B via the supports 11. Similarly, the third cylinder head screw 3 and the fourth cylinder head screw 4 are each connected to a valve guide V via the intake port wall 13*e* and are connected to component B via the supports 11.

The fifth and sixth cylinder head screws 5, 6 are arranged along an axis a which connects the two valve bridges between intake and exhaust. The valve bridges are not visible in FIG. 1.

Figure 3:
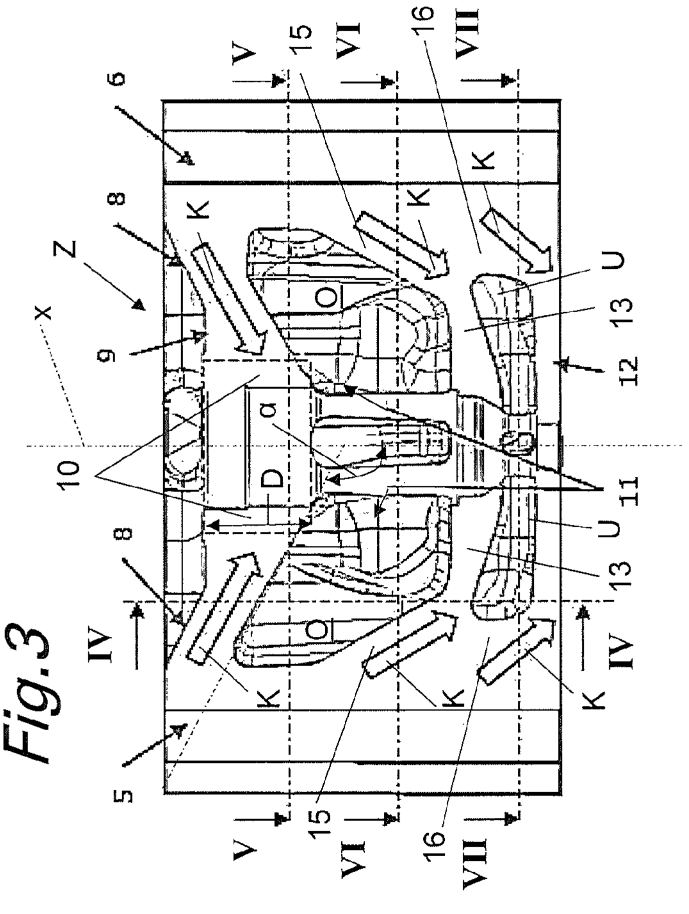
FIG. 3 shows the cylinder head in a section along line III-III according to FIG. 1.

FIG. 3 shows a section along this axis a, which is also marked with line in FIG. 1. In it, it can be seen that a rib 8 leads from the fifth cylinder head screw 5 as well as from the sixth cylinder head screw 6 to the component B in an oil deck 9, and the force introduction along the arrows K is directed from the cylinder head screw 5 and 6 via the rib 8 into the component B and down via the supports 11. The ribs 8 have a thickness D in the area around the component B, where the ribs 8 merge into the ring 10, which also extends over a thickness D.

The rib 8 represents a thickening of the oil deck 9, and the oil deck 9 has an angle $\alpha$ to the axis of rotation of the component B in the region of the rib 8, which is approximately 135°. The ribs 8 run conically to the walls 7 along the angle $\alpha$ just described.

Similarly, the introduction of force is carried out along the arrows K along a fire deck 12 and along an intermediate deck 13. The supports 11 are arranged next to the component B in FIG. 3, are not intersected in this section and can be seen as part of the wall of the upper cooling jacket O. The upper cooling jacket O and a lower cooling jacket U are separated from each other by the intermediate deck 13.

Figure 4:
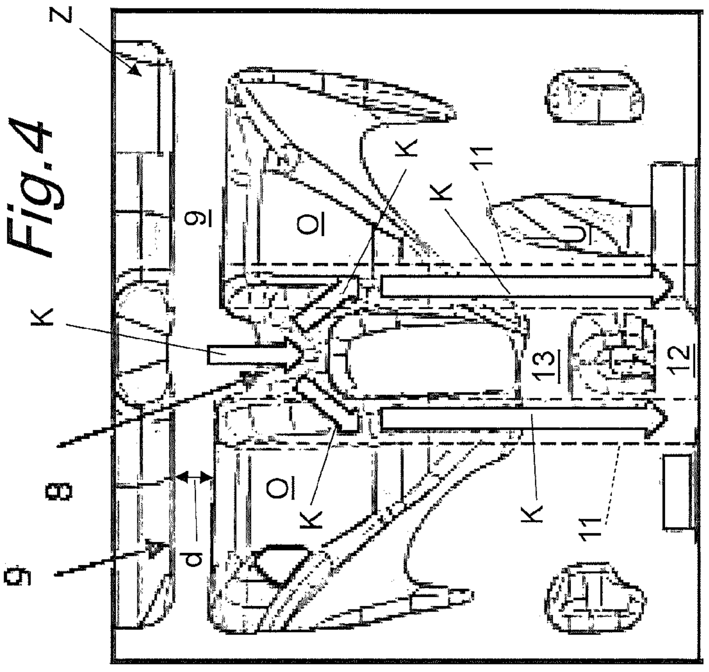
FIG. 4 shows the cylinder head in a section along line IV-IV according to FIG. 3.
Figure 6:
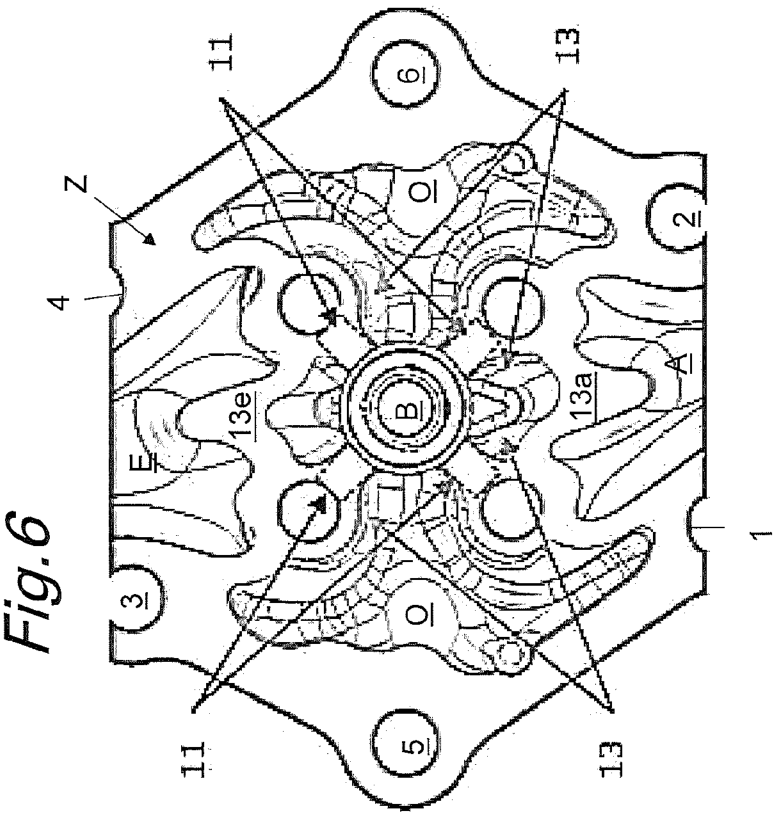
FIG. 6 shows the cylinder head in a section along line VI-VI according to FIG. 3.
Figure 5:
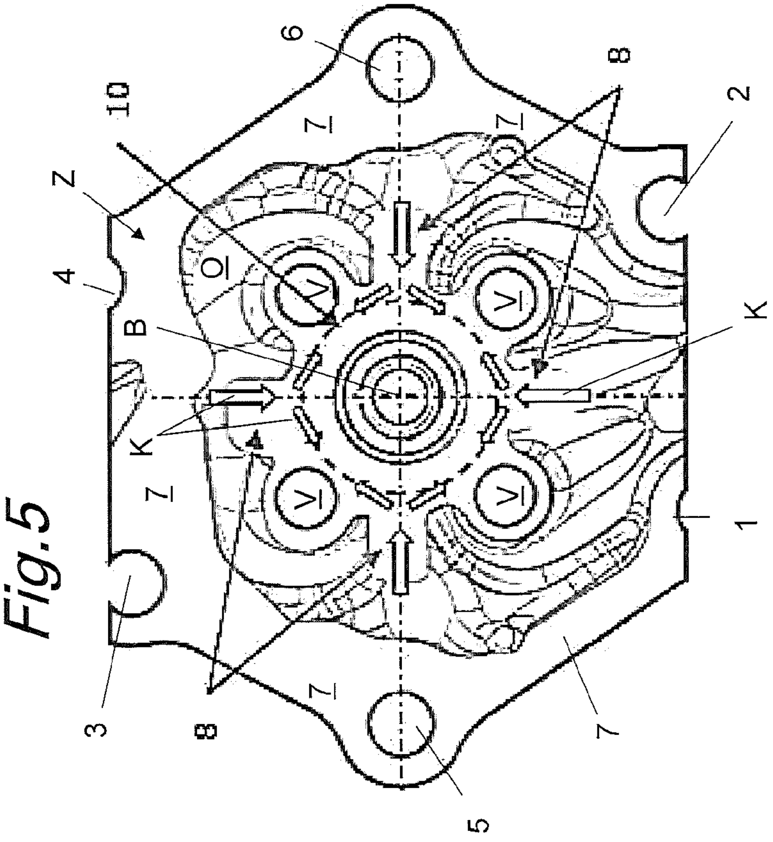
FIG. 5 shows the cylinder head in a section along the line V-V according to FIG. 3.
Figure 7:
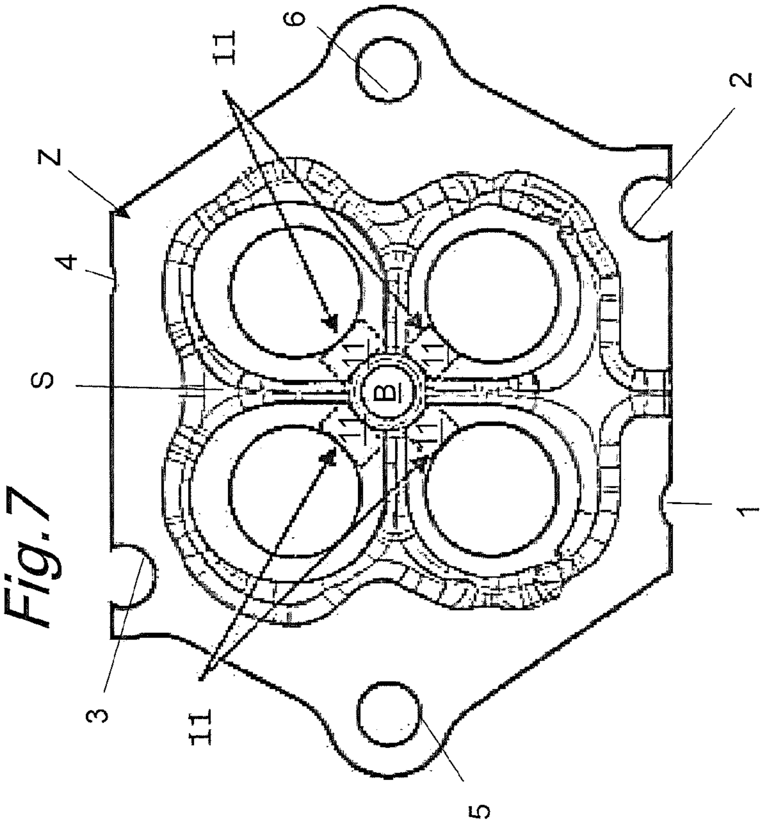
FIG. 7 shows the cylinder head in a section along line VII-VII according to FIG. 3.

The ribs are provided in three planes, so that the force is introduced in three planes of the cylinder head: in the oil deck 9, in the intermediate deck 13 and in the fire deck 12. The ribs provided for the force introduction into the oil deck 9 are given the reference sign 8. The ribs for the force introduction in the intermediate deck 13 are given the reference sign 15 and the ribs to the fire deck 12 have the reference sign 16. In FIG. 4, the force path K from the rib 8 into the supports 11 is shown. The oil deck 9 has an average oil deck thickness d that is smaller than the thickness D of the rib 8. In FIG. 5 to FIG. 7, sections are shown along the lines V-V, VI and VII-VII shown in FIG. 3. In FIG. 5, the force path K can again be seen extending from the ribs 8 to the component B and around it in a circle to the supports 11. Two of the ribs 8 in FIG. 5 are formed by channel walls 13*a* and 13*e*. A seat ring cooling S is provided for cooling the seat rings of the valves, which can be seen in FIG. 7. This seat ring cooling S is part of the lower cooling jacket U.

The ribs 8 and cylinder head screws 1 to 6 are always arranged symmetrically to each other.

In embodiments with six or eight screws, some of them are directly connected to the intake port wall 13*e* or the exhaust port wall 13*a*, which is not the case when four cylinder head screws 14 are used. According to the invention, it is provided that the ribs 8 are not connected to the valve guides V. A force acting on the cylinder head Z is transmitted to the cylinder head screws 1 to 6 or 14 and from these to the ribs 8 and only then to the cylinder head Z itself, whereby a load is better distributed and deformation is avoided. The main load on the cylinder head screws 1 to 6 or 14 is distributed around the valve guide V.

A second embodiment with four cylinder head screws 14 is explained below. Components with the same function have the same reference signs and only the differences are explained. For an understanding of the mode of operation, reference is made to the first embodiment in FIG. 1 to FIG. 7.

Figure 8:
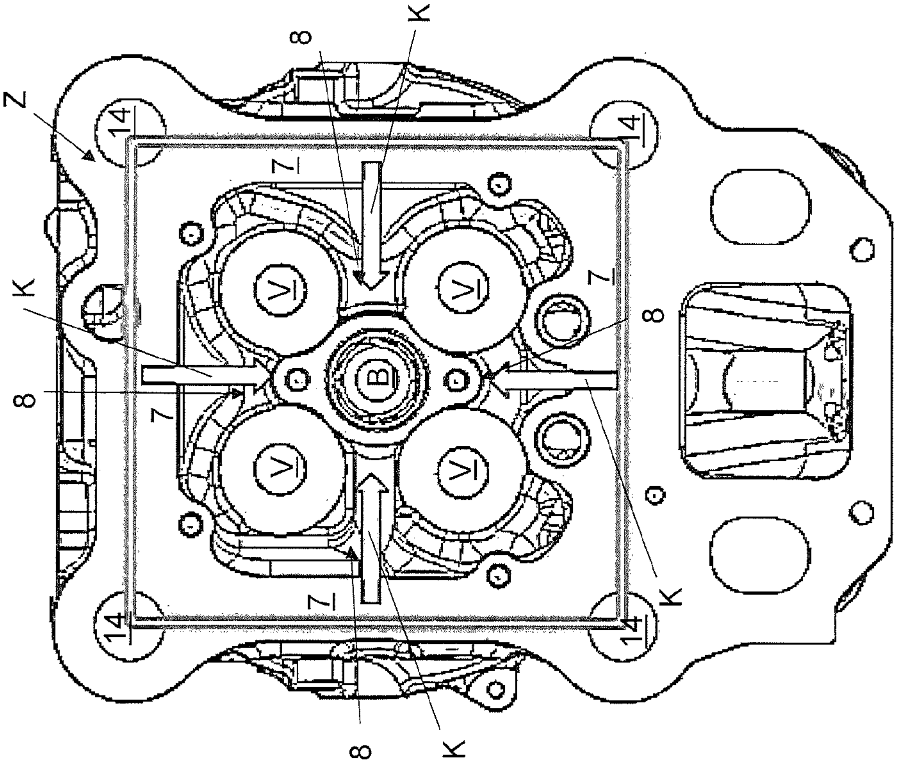
FIG. 8 shows a cylinder head according to the invention in a second embodiment in a view analogous to FIG. 2.
Figure 9:
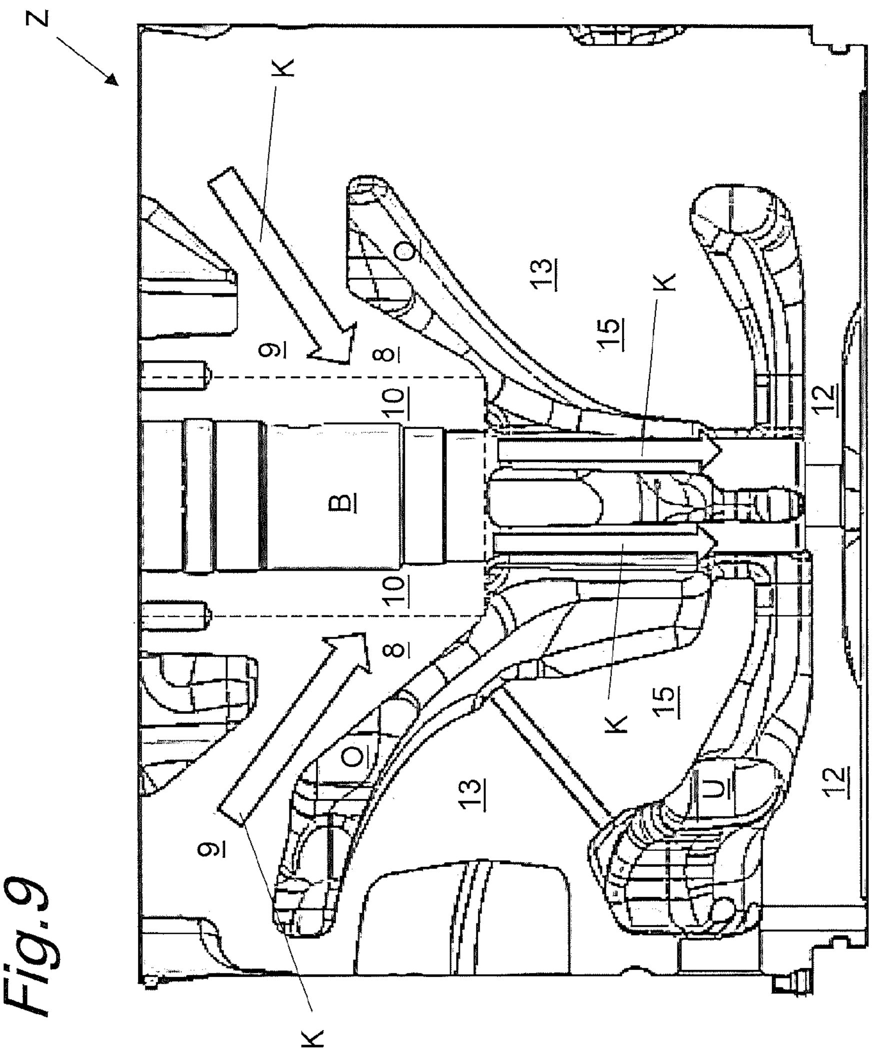
FIG. 9 shows the cylinder head in the second embodiment in a section analogous to FIG. 3.

A second embodiment of cylinder head Z is shown in FIG. 8. Here, the four cylinder head screws 14 are connected via walls 7. The force introduction K is carried out from the walls 7 along the ribs 8. A sectional view of the force introduction K is shown in FIG. 9.

Figure 11:
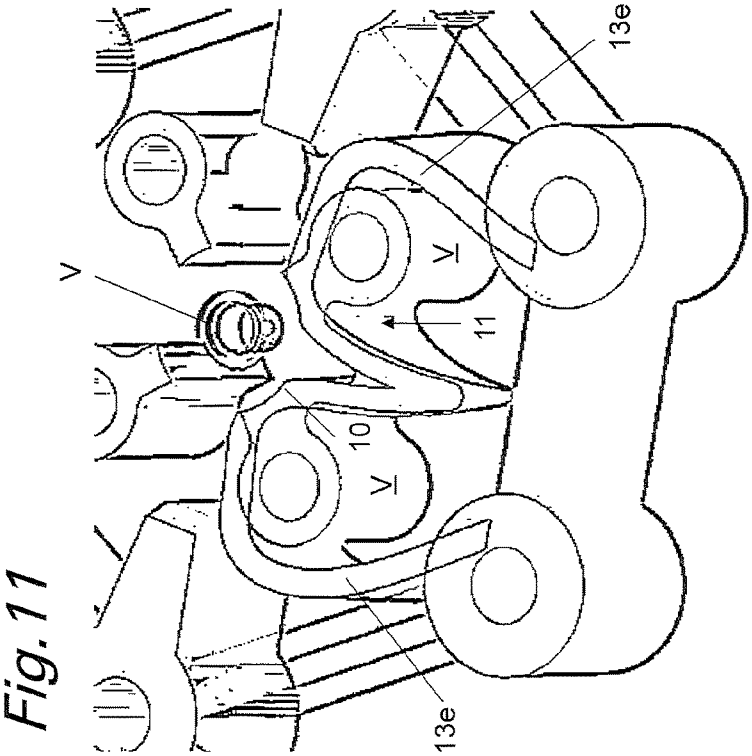
FIG. 11 shows a section analogous to FIG. 10 in a second embodiment.
Figure 10:
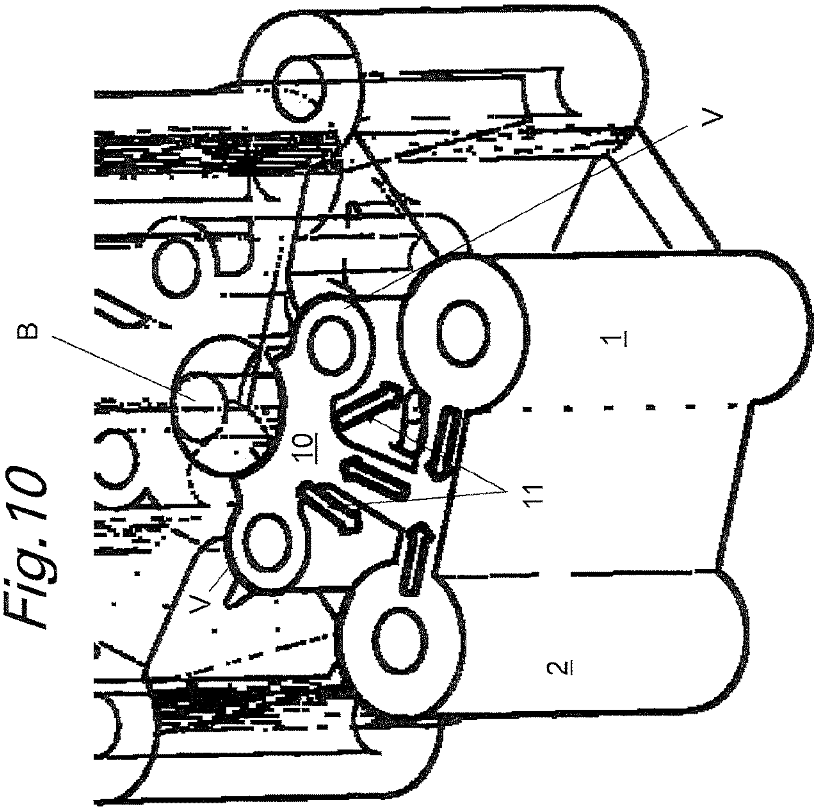
FIG. 10 shows a section of the cylinder head with a schematic force curve in a first embodiment.

FIG. 10 and FIG. 11 show two basic embodiments of the cylinder head Z according to the invention. It can be seen that the ring 10 is arranged around the component B, which is connected to the cylinder head screw slugs and the cylinder head screws via ribs 8.

It is further provided that the vertical supports 11 can merge into the channel walls 13*a*, 13*e*. If no channel walls 13*a*, 13*b* are provided, an additional rib 8, 15, 16 may be provided which directs the force K into the intermediate deck Z. The supports 11 are partially connected directly to the channel wall 13*a*, 13*e*.

The invention claimed is:

1. A liquid-cooled cylinder head, comprising:

a component which extends into a combustion chamber;

an oil deck;

a fire deck;

a plurality of valve guides; and a fixed connection arranged from each valve guide of the plurality of valve guides to the component, the fixed connection including a ring having at least one support, wherein:

the at least one support and the ring extend at least from the oil deck to the fire deck bounding the combustion chamber, the oil deck extends in a tapered manner in a direction of the at least one support and is configured and arranged for introducing forces, and the oil deck encloses an angle (α) to the component which is greater than 90°.

2. The liquid-cooled cylinder head of claim 1, further comprising a plurality of cylinder head screws, wherein the plurality of cylinder head screws are indirectly connected to the plurality of valve guides.

3. The liquid-cooled cylinder head of claim 2, further comprising a plurality of walls, each wall positioned between two cylinder head screws of the plurality of cylinder head screws, wherein each wall extends from the oil deck of the cylinder head to the fire deck, bounding the combustion chamber.

4. The liquid-cooled cylinder head of claim 3, further comprising at least one rib, wherein at least one cylinder head screw of the plurality of cylinder head screws is connected to the at least one support via the at least one rib.

5. The liquid-cooled cylinder head of claim 4, wherein the at least one rib connects two cylinder head screws of the plurality of cylinder head screws, each via the wall, to the ring, wherein the at least one rib is configured and arranged to introduce forces to the ring from the two cylinder head screws.

6. The liquid-cooled cylinder head of claim 4, wherein the at least one rib includes three ribs provided in each case along a cylinder axis between every two cylinder head screws of the plurality of cylinder head screws.

7. The liquid-cooled cylinder head of claim 4, further comprising:

an intermediate deck of the cylinder head;

an additional rib arranged in the intermediate deck of the cylinder head; and wherein the at least one support is directly connected to the further rib.

8. The liquid-cooled cylinder head of claim 2, wherein:

the plurality of cylinder head screws are arranged on a common pitch circle;

the pitch circle has its center in the region of a cylinder axis; and the plurality of cylinder head screws are arranged uniformly on said pitch circle.

9. The liquid-cooled cylinder head of claim 2, wherein at least two cylinder head screws of the plurality of cylinder head screws are arranged in an exhaust port wall.

10. The liquid-cooled cylinder head of claim 2, wherein at least two cylinder head screws of the plurality of cylinder head screws are arranged in an intake port wall.

11. The liquid-cooled cylinder head of claim 1, wherein the ring radially surrounds the component, wherein the ring is connected to the support in the region of the valve guides.

12. The liquid-cooled cylinder head of claim 1, wherein the at least one support extends parallel to a cylinder axis of the cylinder head.

13. The liquid-cooled cylinder head of claim 1, wherein the at least one support is a partition wall which at least partially separates the upper cooling jacket and the lower cooling jacket.

14. The liquid-cooled cylinder head of claim 1, further including two intake valves, and two exhaust valves are provided, wherein at least two cylinder head screws of the plurality of cylinder head screws are arranged on an axis which mutually connects two valve bridges between intake and exhaust.

15. The liquid-cooled cylinder head of claim 1, wherein the plurality of cylinder head screws are connected by walls, wherein each wall is arranged in a plane parallel to a cylinder axis.

16. The liquid-cooled cylinder head of claim 1, wherein the ring and the at least one support are formed from a single piece of material.

17. The liquid-cooled cylinder head of claim 1, wherein the oil deck encloses an angle (α) to the component which is between 110° and 144.

18. The liquid-cooled cylinder head of claim 1, wherein the oil deck encloses an angle (α) to the component which is between 120° and 135°.

19. The liquid-cooled cylinder head of claim 1, further including at least one rib, wherein—at least two mutually opposite cylinder head screws are each connected to the at least one support via the at least one rib.

20. The liquid-cooled cylinder head of claim 19, wherein the at least one rib is arranged in an intermediate deck of the cylinder head.

* * * * *